United States Patent
Collier et al.

(10) Patent No.: US 8,234,515 B2
(45) Date of Patent: Jul. 31, 2012

(54) REPURPOSABLE RECOVERY ENVIRONMENT

(75) Inventors: Ryan Collier, Minneapolis, MN (US); Sandro Lorenzotti, Chicago, IL (US); Gaurang Patel, Woodstock, GA (US); Jay Corn, Greenwood Village, CO (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 12/752,310

(22) Filed: Apr. 1, 2010

(65) Prior Publication Data

US 2011/0246813 A1   Oct. 6, 2011

(51) Int. Cl.
G06F 11/00 (2006.01)

(52) U.S. Cl. .......................................................... 714/1
(58) Field of Classification Search ...................... 714/1
See application file for complete search history.

(56) References Cited

U.S. PATENT DOCUMENTS

| | | | | |
|---|---|---|---|---|
| 6,671,818 B1 * | 12/2003 | Mikurak | ...................... | 714/4.21 |
| 6,718,383 B1 * | 4/2004 | Hebert | ........................... | 709/224 |
| 6,728,780 B1 * | 4/2004 | Hebert | ........................... | 709/239 |
| 6,732,186 B1 * | 5/2004 | Hebert | ........................... | 709/239 |
| 6,763,479 B1 * | 7/2004 | Hebert | ......................... | 714/4.11 |
| 7,020,697 B1 * | 3/2006 | Goodman et al. | ............ | 709/223 |
| 7,194,543 B2 * | 3/2007 | Robertson et al. | ............ | 709/226 |
| 7,213,246 B1 | 5/2007 | Van Rietschote et al. | | |
| 7,409,577 B2 * | 8/2008 | Wing et al. | ................... | 714/4.12 |
| 7,467,198 B2 * | 12/2008 | Goodman et al. | ............ | 709/223 |
| 7,484,032 B2 * | 1/2009 | Smith | ........................... | 710/316 |
| 7,734,596 B2 * | 6/2010 | Vivian et al. | ................... | 707/674 |
| 7,734,945 B1 * | 6/2010 | Levidow et al. | ................... | 714/3 |
| 7,788,524 B2 * | 8/2010 | Wing et al. | ................... | 714/4.1 |
| 7,844,444 B1 * | 11/2010 | Asbridge et al. | ................ | 703/23 |
| 7,930,531 B2 * | 4/2011 | Chow et al. | ....................... | 713/2 |
| 2002/0091805 A1 | 7/2002 | Phillips et al. | | |
| 2004/0172574 A1 * | 9/2004 | Wing et al. | ........................ | 714/4 |
| 2005/0081097 A1 | 4/2005 | Bacher et al. | | |
| 2007/0294563 A1 * | 12/2007 | Bose | ................................. | 714/5 |
| 2008/0091746 A1 | 4/2008 | Hataski et al. | | |
| 2010/0325471 A1 * | 12/2010 | Mishra et al. | ...................... | 714/3 |
| 2011/0022879 A1 * | 1/2011 | Chavda et al. | ...................... | 714/1 |

FOREIGN PATENT DOCUMENTS

WO         02097624 A2      12/2002

* cited by examiner

*Primary Examiner* — Amine Riad
(74) *Attorney, Agent, or Firm* — Mannava & Kang, P.C.

(57) ABSTRACT

A reconfiguration manager is operable to reconfigure a repurposable recovery environment between a recovery environment for a production environment and a second environment different from the recovery environment. A storage system in the repurposable recovery environment periodically saves production information from the production environment while the repurposable recovery environment is operating as the second environment. The production information in the storage system is used to reconfigure the repurposable recovery environment from the second environment to the recovery environment.

26 Claims, 6 Drawing Sheets

REPURPOSABLE RECOVERY ENVIRONMENT

GOVERNMENT RIGHTS IN THE INVENTION

This invention was made with Government support under contract number TIRNO-06-D-00006 TO 08 awarded by the Internal Revenue Service. The Government has certain rights in the invention.

BACKGROUND

Currently, many systems have dedicated disaster recovery environments that are available in case of failure. While the disaster recovery environments may be critical for systems that cannot afford downtime, the systems in the disaster recovery environments require a significant amount of resources to maintain. The resources may include hardware, data center space, power, cooling, hardware maintenance costs, etc. Also, the systems in the disaster recovery environment are largely unused and thus represent wasted resources most of the time. For example, a complex enterprise system running business processes may comprise many different components, including web servers, database servers, application servers, etc. The disaster recovery environment for these complex systems would also include many servers, network components, applications and code, which must be maintained so the disaster recovery environment is continuously ready for failover in case of failure of the production environment which is currently running the business processes. This typically includes version control for the applications and code running on the disaster recovery systems to make sure the disaster recovery systems are in synchronization with the systems of the production environment. This often includes time consuming tasks of manually keeping track of application and code versions for the production systems and manually uploading the new versions onto the servers in the disaster recovery systems. Also, the network components of the disaster recovery environment, such as routers and switches, need to be configured and maintained by system administrators. If the disaster recovery environment is not maintained to be in-sync with the production environment, this could result in a non-functional disaster recovery environment or a disaster recovery system that does not provide complete functionality. The constant configuration and maintenance of the disaster recovery systems requires significant time and monetary expenditure for companies that need to have a disaster recovery environment for critical systems, and the companies may get minimal use from their disaster recovery systems since often they are only used in case of a catastrophic disaster of the production system and/or data center site.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments. Furthermore, different embodiments are described below. The embodiments may be used or performed together in different combinations.

1. Overview

According to an embodiment of the invention, a repurposable recovery environment is operable to function as a recovery environment for a production environment when needed, such as in response to failure of the production environment, or to function as a different environment, such as a staging environment or any other type of non-recovery environment. For example, the repurposable recovery environment may function as a staging environment while a production environment runs normal business operations. The staging environment may be used for developing and testing of code and application or other systems prior to releasing them into the production environment. In response to failure of the production environment, the repurposable recovery environment is repurposed from the staging environment to the recovery environment so production systems can run in the recovery environment. Thus, the staging environment can be repurposed as the recovery environment to resume normal business operations in the event of failure of the production environment. As a result, this avoids the need for maintaining a dedicated disaster recovery infrastructure that may be largely underutilized.

Furthermore, recovery processes according to the embodiments include the streamlined repurposing of infrastructure elements of the repurposable recovery environment, including configuring network devices (e.g., routers, switches, firewalls, load balancers), storage devices (e.g., a storage area network (SAN) and replication enablers), and servers (both physical and virtual). Through these processes, the amount of system administration time needed to maintain and configure systems to be used in the recovery environment in the event of a production environment failure is significantly minimized.

2. System

Figure 1:
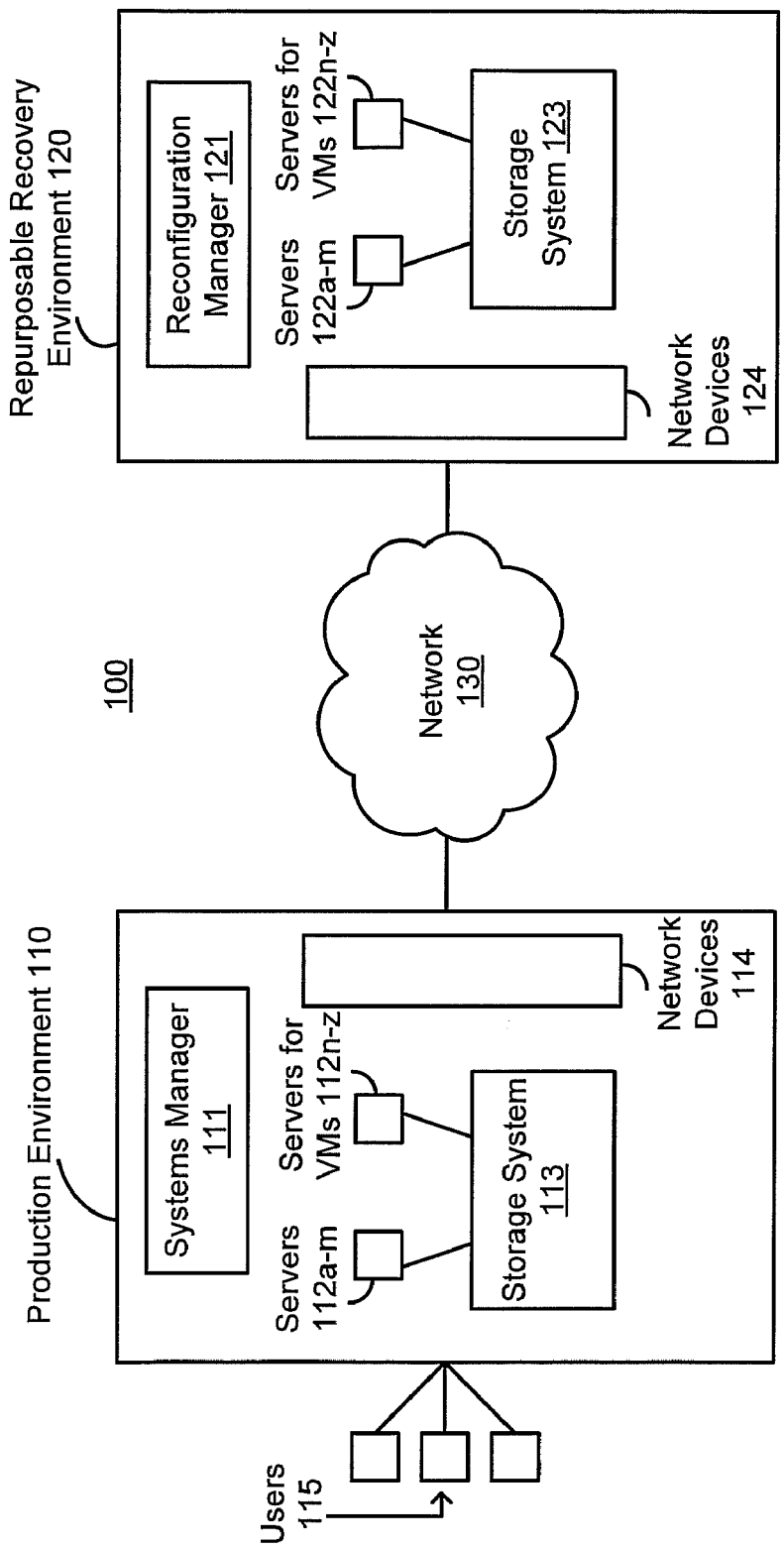
FIG. 1 illustrates a system, according to an embodiment.

FIG. 1 illustrates a system 100, according to an embodiment. The system 100 includes a production environment 110 and a repurposable recovery environment 120. An environment as used herein includes multiple devices and software. In one example, an environment is a site including hardware and software, such as applications, and code, used to run day-to-day operations and processes. The hardware may include servers, network devices, such as routers, switches, firewalls, load balancers, etc., and storage. The production environment 110 and the repurposable recovery environment 120 as shown are examples of environments, but it will be apparent to one of ordinary skill in the art that the production environment 110 and the repurposable recovery environment 120 may not include all the components or may include different components than shown in FIG. 1.

The production environment 110, for example, includes systems manager 111, servers 112*a-m*, servers 112*n-z* hosting virtual machines (VMs), storage system 113, and network devices 114. Note that the servers 112*a-m* are shown separately from the servers 112*n-z* to illustrate that the production environment 110 may include servers that host VMs and servers that do not host VMs. Users 115 may be local to the production environment 110 or may be remote users of the production environment 110, for example, connected via a network, such as a wide area network (WAN) or a local area network (LAN). The users 115 may use applications running on the servers 112*a-z* (which may include applications running on VMs) to perform daily tasks. Production information is stored in the storage system 113. The production information may include one or more of applications, data for the applications, configuration information for devices, such as boot information, operating system (OS), network device configuration information, configuration information for VMs, and any other information used in the production environment 110. At least some of the production information may also be stored locally on workstations. The network devices 114 may include routers, switches, firewalls, load balancers, etc., and are used to manage the network connections internal to the production environment 110 and also manage network connections between remote locations, including the repurposable recovery environment 120, and the production environment 110. The systems manager 111 may perform various functions related to site management, site recovery, and site backup. For example, the systems manager 111 may control local data backups, which may be stored in the storage system 113. The systems manager 111 may store information identifying all the devices in the production environment 110 and configuration information for the devices. The systems manager 111 may include software for recovering from system failures, such as data recovery software, virtual machine (VM) recovery software, etc. The systems manager 111 may control the periodicity for sending production information to the repurposable recovery environment 120, and also may include off-the-shelf software for data recovery and VM recovery.

The production environment 110 and the repurposable recovery environment 120 may be in two geographically dispersed hosting locations and may be connected by a network 130. Although not shown, multiple production and recovery sites may be used. The network 130 may be a public WAN, such as the Internet or a private WAN. Alternatively, the production environment 110 and the repurposable recovery environment 120 may be located at one location, and may be connected via a LAN.

The repurposable recovery environment 120, for example, includes reconfiguration manager 121, servers 122*a-z*, storage system 123, and network devices 124. The users 115 of the production environment 110 may connect to the repurposable recovery environment 120 when fail over occurs. Although not shown, users may also connect to the repurposable recovery environment 120 when it is operating as a staging environment or other non-recovery environment.

The reconfiguration manager 121 configures the repurposable recovery environment 120 to operate as either a recovery environment for the production environment 110 or to operate as some other type of environment, such as a staging environment. A staging environment, for example, is used to develop and test systems for the production environment 110. For example, a software application for the production environment 110 is developed and tested in the staging environment and then released and used in the production environment 110. New versions of the application may continue to be developed and tested in the staging environment while a current version is used in the production environment 110. The staging environment may be used for testing other systems before being released to the production environment. For example, a new storage system may be tested in the staging environment with existing applications and other software for the production environment 110. After testing and debugging in the staging environment, the system may be deployed in the production environment 110.

When the repurposable recovery environment 120 is operating as a staging environment, the users may include developers and testers, rather than typical end users of business applications in the production environment 110. When operating as a staging environment, the servers 122*a-z*, storage system 123, and network devices 124 are utilized as resources for development and testing.

The reconfiguration manager 121 is also operable to configure the repurposable recovery environment 120 as a recovery environment for the production environment 110. The reconfiguration manager 121 may determine that the production environment 110 has failed, and the reconfiguration manager 121 reconfigures the servers 122*a-z*, storage system 123, and network devices 124 to operate as the servers 112*a-z*, storage system 113, and network devices 114 in the production environment 110. In one example, the reconfiguration manager 121 receives notification from a system administrator or another system of failure of the production environment 110. The reconfiguration manager 121 may shut down servers 122*a-m* in the staging environment and reboot the servers 122*a-m* so they can be configured and used for the recovery environment. All the servers 122*a-m* may not be shut down if only some of the servers are needed for the production applications. Also, the servers 122*n-z* hosting VMs may not be shut down. These servers may be reconfigured to include the VMs and the applications from the production environment 110 without being shut down. The reconfiguration manager 121 may send configuration information to the servers 122*a-z* and to network devices 124 to configure these devices for the recovery environment. The reconfiguration manager 121 may perform other functions described herein for reconfiguring the environments.

After reconfiguration from the staging environment to the recovery environment, the users 115 may connect to the repurposable recovery environment 120 operating as the recovery environment and perform their daily tasks and functions that they would normally perform in the production environment 110.

In one embodiment, the servers 122*a-z*, storage system 123, and network devices 124 in the repurposable recovery environment 120 are the same types of devices as the servers 112*a-z*, storage system 113, and network devices 114 in the production environment 120. If the devices are the same in both environments, then the recovery environment should be more robust. The same type devices, also referred to as equivalent devices to the devices in the production environment 110, may include the devices that are the same model and have the same specifications or configurations, such as same amount of memory and same processors in the case of servers. Also, when the devices are reconfigured in the repurposable recovery environment 120, the devices host the same VMs, run the same applications and run any other software that was used in the production environment 110. Reconfiguration of the repurposable recovery environment 120 from the staging environment to the recovery environment is described in further detail below.

Figure 2:
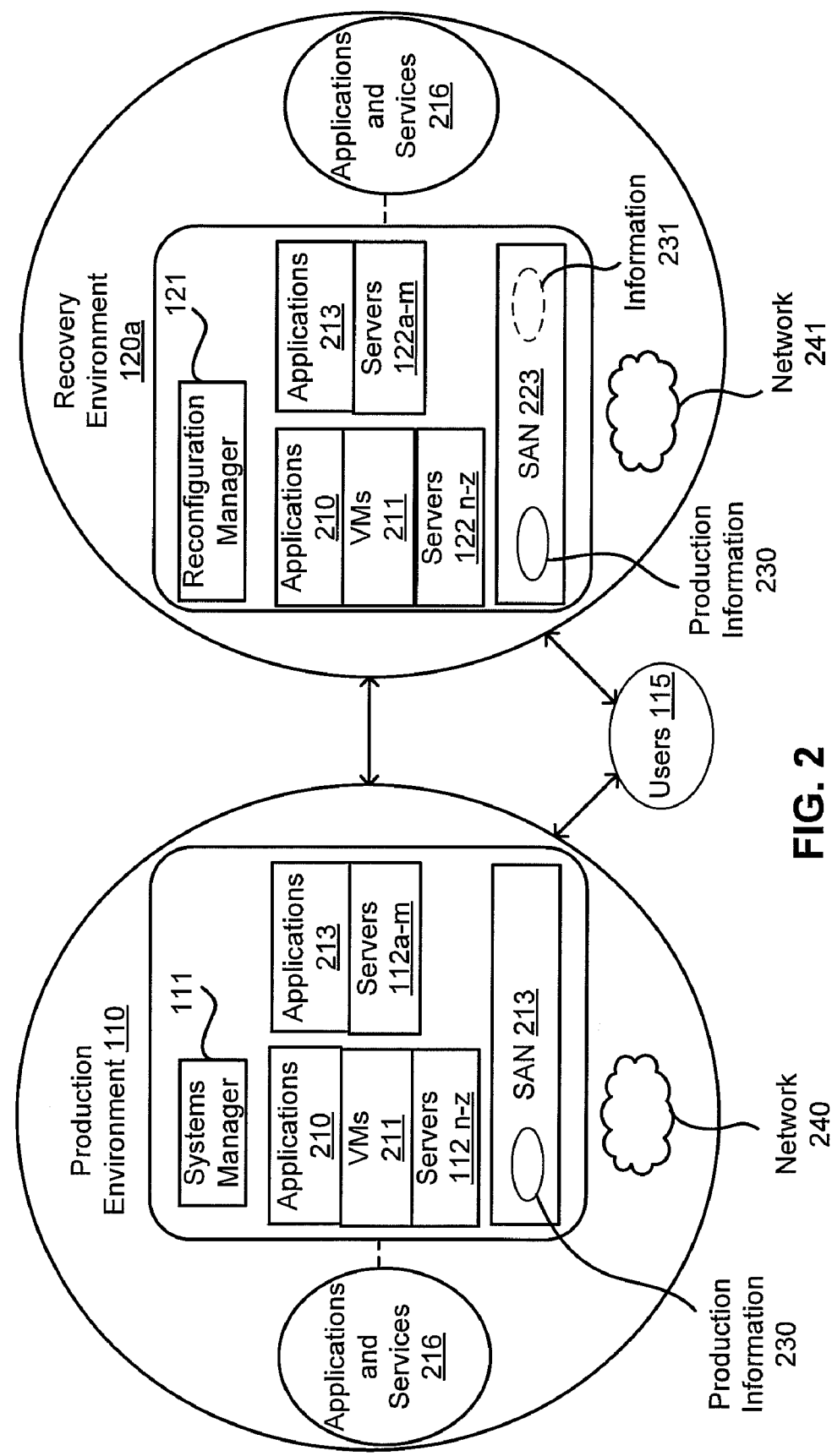
FIGS. 2 and 3 illustrate architectures for different environments, according to an embodiment.
Figure 3:
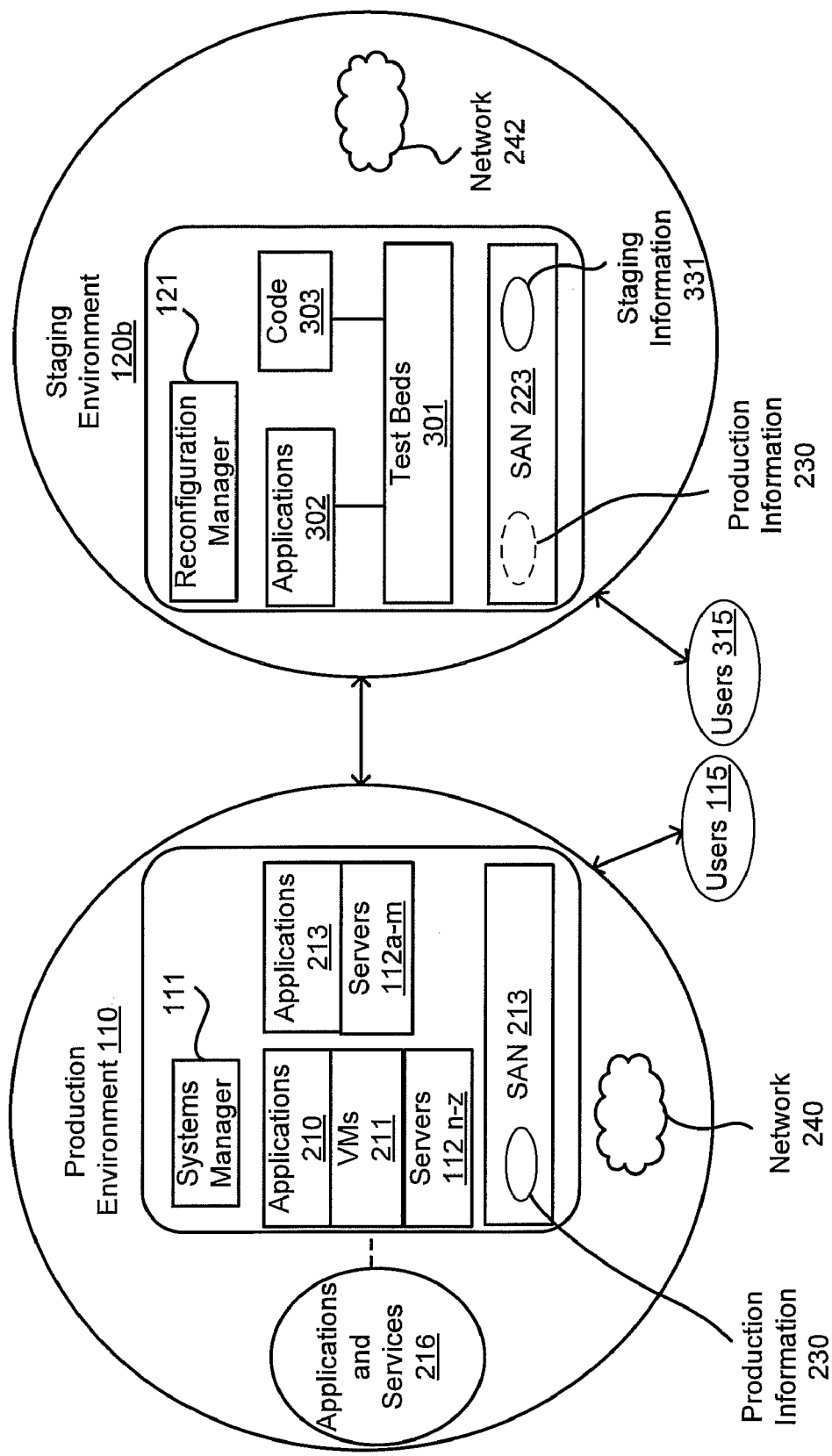

FIG. 2 illustrates an architecture of the production environment 110 and the repurposable recovery environment 120 operating as recovery environment 120a, e.g., after the repurposable recovery environment 120 is configured as the recovery environment 120a from a staging environment 120b, shown in FIG. 3, or from another type of environment. The production environment 110 includes the systems manager 111, which may be software running on a server or other platform, and applications 210 and 213. The applications 210 are running on VMs 211 hosted by VM infrastructure, which may include servers 112n-z also shown in FIG. 1, and VM software for creating and hosting VMs. The applications 213 are hosted by servers 112a-m, also shown in FIG. 1, rather than VMs. Production information, is stored in the storage system 113. The production environment 110 operates to provide the users 115 with applications and services 216. Also, the servers, users 115 and other devices in the production environment may be connected via network 240. The network 240 includes the network devices 114 shown in FIG. 1. The configuration of the network devices 114 may be included in production information 230 described below and replicated to the recovery environment 120a. Network 241 in the production environment is configured similarly to the network 240, as is further described below. The network 241 includes the network devices 124 shown in FIG. 1.

In one embodiment, the architecture of the recovery environment 120a is the same as the production environment 110, except it includes the reconfiguration manager 121 controlling configuration into the recovery environment 120a. After configuration into the recovery environment 120a, the users 115 can connect to the recovery environment 120a to access the same applications and services 216 that were available in the production environment 110.

The storage systems 113 and 123 in the production environment 110 and the repurposable recovery environment 120 may include SANs 213 and 223, respectively. However, it will be apparent to one of ordinary skill in the art that other types of storage systems may be used to store the information described herein. As shown in FIG. 2, the SAN 213 in the production environment 110 stores production information 230 which may include one or more of applications, such as the applications 210 and 213, data used by the applications, configuration information for devices, such as boot information, operating system (OS), network device configuration information, configuration information for VMs, and any other information used in the production environment 110. The production information 230 is periodically replicated to the SAN 223, as is further described below, and is thus readily available in case of failure of the production environment 110. The SAN 223 also stores information 231 for the staging environment and/or any other environment for which the repurposable recovery environment 120 is being used. The information 231 is shown in a dashed format because it is not being used when the repurposable recovery environment 120 is operating as the recovery environment 120a.

FIG. 3 illustrates an architecture of the production environment 110 and the repurposable recovery environment 120 operating as the staging environment 120b. The production environment 110 is the same as shown in FIG. 2. The architecture of the staging environment 120b may includes test beds 301, applications 302, and code 303. The test beds 301 may include one or more of the servers 112a-z shown in FIG. 1, one or more of the network devices 124 and one or more VMs that collectively provide test beds for testing the applications 302 and the code 303. As described above, the staging environment 120b may be used for developing and testing code and applications or other systems prior to releasing them into the production environment, and the applications 302 and the code 303 are shown as examples of software that is tested. Other systems may also be tested. Also, a network 242 may be created by configuring network devices 124 and is used to connect devices and users in the staging environment 120b. The network 242 includes a different configuration than the network 241 in the recovery environment 120a. For example, the network 242 uses different IP addresses and may configure routers and switches differently.

The reconfiguration manager 121 controls configuration of the repurposable recovery environment 120 into the staging environment 120b. After configuration into the staging environment 120b, users 315 can connect to the staging environment 120b, for example, to test and develop various systems. The users 315, which may include testers and developers, may be different than the end users 115 of the production environment.

The SAN 223 stores staging information 331, which may be included in the information 231 shown in FIG. 2. The staging information 331 may include the testing data, configuration information, or any other information used by the staging environment 120b or information needed to configure the test beds 301 or any other devices for the staging environment 120b. While the repurposable recovery environment 120 is operating as the staging environment 120b, the production information 230 may be periodically replicated from the production environment 110 and stored in the SAN 223, as is further described below. Also, the repurposable recovery environment 120 may be configured for environments other than a staging environment.

3. Replication of Production Storage in Reconfigurable Staging Center Environment According to an embodiment, the production information 230 is replicated from the production environment 110 to the repurposable recovery environment 120. The replication occurs while the repurposable recovery environment 120 operates as the staging environment. The replication from the production environment 110 to the repurposable recovery environment 120 occurs periodically so there is minimal data loss in case of failure of the production environment. For example, a failure in the production environment 110 may result in only 15 minutes of data loss or less. The delay may be caused at least partially by WAN/LAN configuration and speed, and thus may vary from 15 minutes.

As described above, the storage systems 113 and 123 in the production environment 110 and the repurposable recovery environment 120 respectively may include SANs 213 and 223 respectively and volumes are replicated from the SAN 213 in the production environment 110 to the SAN 223 in the repurposable recovery environment 120. Also, one embodiment for replication may include synchronizing the data between the SANs 213 and 223 so all the production data is stored on both SANs 213 and 223. An initialization process is first performed so all the production data on the SAN 213 in the production environment 110 is stored on the SAN 223 in the repurposable recovery environment 120. After the production data has been initialized, scans are performed to identify any differences between volumes in the environments. Then, only the differences are transferred in compressed form to allow a faster synchronization process, which may be performed in almost real-time.

Also, when replicating volumes, consistency groups may be established which include one or more replication sets. Each replication set includes a production volume and a replica volume to which it is replicating. The consistency group ensures that updates to the replicas are always consistent and in correct write order, i.e., the replicas can always be used by the users to continue working or used to restore the production environment 110. Also, the consistency group allows for the configuration of speed, size, and location of the replicated volumes. The consistency group monitors all the volumes added to it to ensure consistency and write-order fidelity. If two data sets are dependent on one another (for instance, a database and a database log), they may be provided in the same consistency group.

Figure 4:
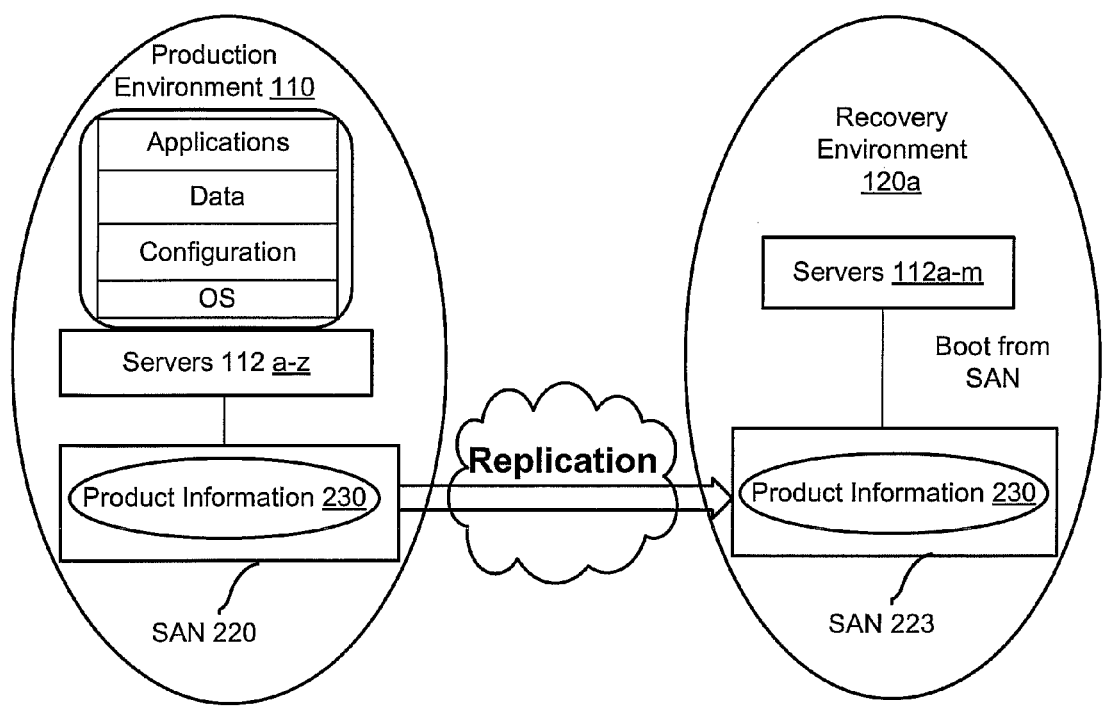
FIG. 4 illustrates replicating production information and booting from a SAN, according to an embodiment.

FIG. 4 shows production information periodically replicated from the SAN 220 in the production environment 110 to the SAN 223 in the repurposable recovery environment 120 operating as the staging environment. The production information 230, which may be on the servers 112a-z, is stored in the SAN 220. The production information 230 is periodically replicated to the SAN 223 over the network. The SAN 223 may also store other information, such as the staging information 231, the boot information 232, and the device configuration information 233.

4. Boot from SAN

According to an embodiment, the storage system 123, shown in FIG. 1, of the repurposable recovery environment 120 stores system boot images for the servers 122a-m in the repurposable recovery environment 120. The boot images may be included in the production information 230 shown in FIG. 4, which is stored in the SAN 223. The servers 122a-m may then boot from the images stored in the SAN 223 to replicate the production environment 110. The boot images may include operating systems (OSs) and other information used to boot the servers. In the case of using SANs for the storage systems in the environments, storage devices may be added as needed. Storage devices may be added if needed to store the boot images for the servers 122a-m, and the servers 122a-m can then boot from the SAN 223 in the recovery environment 120a as opposed to booting from each individual server. As a result, administrators can improve availability, data integrity, provisioning speed, and disaster recovery. In one embodiment, the servers 122a-m in the repurposable recovery environment 120 have the exact configuration including Internet protocol (IP) addresses, globally unique identifiers (GUIDs), and server names, as the servers in the production environment 110. In other embodiments, a similar rather than an exact same configuration may be used in the repurposable recovery environment 120.

FIG. 4 provides an illustration of booting from the SAN 223 in the recovery environment 120a. For example, the production environment 110 becomes unavailable for users. All or substantially all of the data has been replicated to the SAN 223 in the repurposable recovery environment 120. The servers 212a-m are shut down to reconfigure from the staging environment to the recovery environment. Then, the servers 212a-m are booted from SAN 223 using the boot information in the SAN 223. Note that each physical server in the production environment 110 may have an equivalent physical server in the repurposable recovery environment 120. After the physical server operating as a stage server shuts down, the server is booted up to operate as a server for the production systems in the recovery environment 120a. Thus, essentially, the same server that was accessed by a user in the production environment 110 is now accessed by the user in the recovery environment 120a. The changes will appear seamless for the user. The servers 222n-z in the recovery environment 120a host the VMs for the production systems, and these servers may not need to be shut down to be reconfigured to host the VMs for the production systems.

5. Network Reconfiguration

The physical servers, VMs, and network devices in the production environment 110 have an addressing schema, which may include an IP address assigned to each one and routing information based on device type. The configurations and addressing schema of the production environment 110 are replicated in the recovery environment 120a. For example, a server in the production environment 110 has an IP address. The same IP address is assigned to the equivalent server in the recovery environment 120a. Thus, the same IP addresses of devices and VMs in the production environment 110 are applied to the equivalent devices and VMs in the recovery environment 120a. Using the same IP addresses in a recovery environment 120a and the migration of network segments is a stark departure from conventional disaster recovery systems. Conventional disaster recovery systems typically use new IP addresses, at least in part, because the conventional disaster recovery systems are running at the same time as the production systems and thus must have different IP addresses than the production systems.

Also, configurations of the equivalent devices are generally the same as the production environment 110, so configurations known to be current, valid and robust are used for the devices, VMs, and applications. For example, if the production environment 110 fails, the staging environment 120b is shut down. Note that the entire staging environment 120b may not be shut down if, for example, a portion of the staging environment 120b can accommodate the production environment 110. The network in the repurposable recovery environment 120 is reconfigured for use in the recovery environment 120a using configurations from the production environment 110. Some of the reconfigurations include updating core switches with additional virtual local area networks (VLANs) related to the production environment network. Related VLAN routing information is also configured. An Internet Firewall interface is re-addressed to a production IP. Other firewalls are updated with the current configuration from the production firewalls. Fax servers are readdressed to ensure that users have access. External domain name system (DNS) tables for resources in the recovery environment 120a that can be resolved externally are updated with the new IP addresses.

The network 241 in the recovery environment 120a uses most of the current production network configurations. Also, the configurations may be pre-built and pushed to the network devices in the recovery environment 120a during reconfiguration. For example, the network device configuration information is pre-built and stored in the SAN 223 shown in FIG. 4, and is pushed to network devices, such as the network devices 124 shown in FIG. 1. In another example, the network device configuration information is stored in a dormant state in the network devices 124 and is invoked when reconfiguring to the recovery environment 120a. Also, prior to making any configuration changes, the stage environment configurations are stored in the SAN 223, for example, as part of the staging information 331 shown in FIG. 3, or network device configuration information for the staging environment 120b is stored in the network devices 124 in a dormant state and invoked when reconfiguring to the staging environment 120b.

Figure 5:
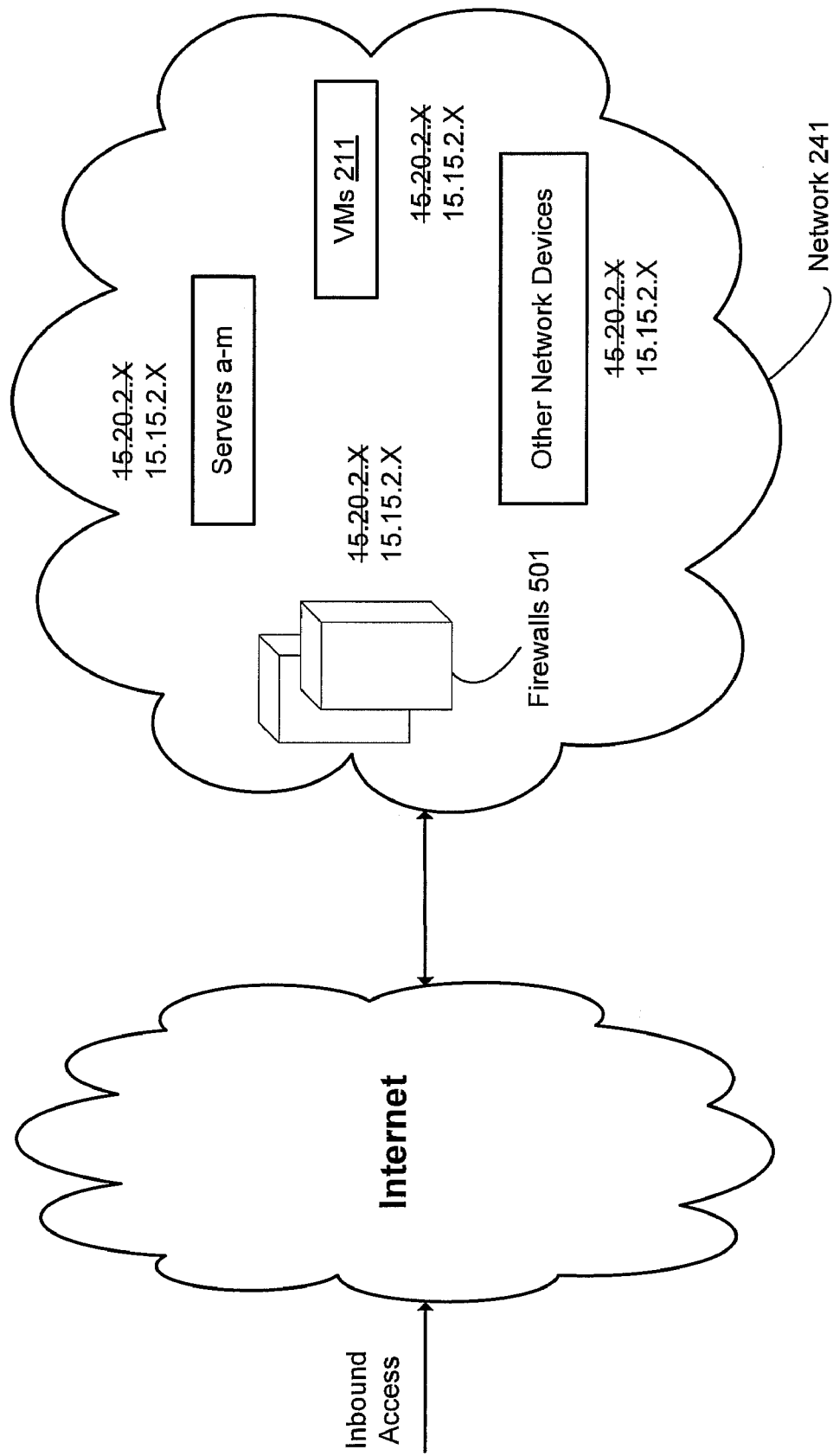
FIG. 5 illustrates reconfiguring network devices, according to an embodiment.

FIG. 5 shows some of the IP address reconfigurations that may be performed in the recovery environment 120a to mimic the configurations in the production environment 110. The production environment 110 uses 15.15.2.x, and the staging environment 120b uses 15.20.2.x. To reconfigure to the recovery environment 120a, firewalls 501 are changed to the production IP addresses of 15.15.2.x. Servers 122a-m and VMs and network devices 124 are also configured to the 15.15 IP addresses of the production environment 110.

6. Configuring VMs in the Repurposable Recovery Environment

The production environment 110 may use VMs, such VMs hosted on servers 112n-z shown in FIG. 1, and as a result, equivalent VMs are brought up and used in the recovery environment 120a on servers 122n-z. Fail over steps and boot orders are configured in advance and stored in the SAN 223. The fail over steps and boot orders are used to bring up the VMs in the recovery environment 120a.

For example, VMs in the stage environment 120b are shut down to free up resources for running the production VMs. One or more of the stage VMs may stay up if sufficient resources are available for running the production VMs in the recovery environment 120a. The production VMs are then brought up in the recovery environment 120a. An order may be specified for booting VMs. The order may be based on factors such as criticality to infrastructure and business. For example, VMs for active directory services, network services, and other services are booted up first. Then, VMs for critical business applications are booted. Lower priority monitoring services and applications may be booted last.

7. Method

Figure 6:
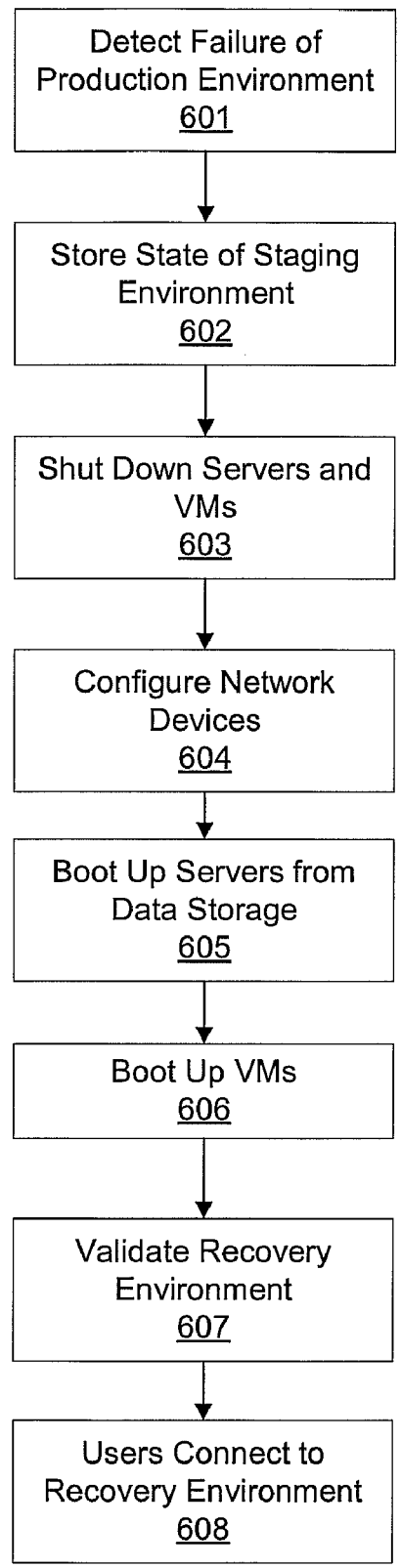
FIG. 6 illustrates a flow chart of a method for reconfiguring a repurposable recovery environment, according to an embodiment.

FIG. 6 shows a flow chart of a method 600 for reconfiguring the repurposable recovery environment 120, according to an embodiment. The method 600 is described with respect to the components of one or more of the FIGS. 1-5 by way of example, and the methods may be performed in other systems.

The method 600 assumes the production information 230 is replicated on the storage system, such as the SAN 223, in the repurposable recovery environment 120, as described above.

At step 601, a failure of the production environment 110 is detected. The failure may include a failure that renders the entire production environment 110 unusable by users or most of the production environment 110 unusable. Detection of the failure may include an indication of the failure provided to the reconfiguration manager 121 by a system administrator or another system.

At step 602, the state of the staging environment is stored in the SAN 223, which is shown as staging information 331 in FIG. 3. For example, the staging information 331 may include current state of testing and development of an application or system, server and network configurations and any other information used in the staging environment. Some or all of this information may already be stored in the SAN 223 if the SAN 223 is operating as a central repository for data used in the staging environment. In this case, the staging information 331 is already stored in the SAN 223. If any of the staging information 331 is stored locally in workstations or servers, then at step 602, this information is saved to the SAN 223.

At step 603, the servers and VMs in the staging environment 120b are shut down to free up resources for the production systems. For example, the servers 122a-m may be shut down because those servers are equivalent to the servers 112a-m running the production applications 213. Thus, the servers 122a-m in the repurposable recovery environment 120 are shut down so they can be reconfigured similar to the servers 112a-m from the production environment 110 to run the production applications 213. The stage VMs running on the servers 122n-z may be shut down also so production VMs can be booted up on those servers to run production applications 210. All the servers and VMs may not be shut down if sufficient resources are available to run the production systems.

At step 604, the network devices 124 in the repurposable recovery environment 120 are reconfigured to the configurations of the network devices 114 in the production environment 110. The network devices 124 are configured similarly to the network devices 114 of the production environment 110. For example, the network devices 124 in the repurposable recovery environment 120 are configured with the same IP addresses as the network devices 114 in the production environment 110. Other configurations are also the same as the production environment 110. For example, switch and router port settings, firewall settings and other settings are the same as or similar to the configurations of the equivalent network devices in the production environment 110. The configuration of the network devices 124 allows the network 241 to be created that replicates the network 240 from the production environment 110 used by the production systems.

At step 605, servers are booted from the data storage in the repurposable recovery environment 120. For example, the servers 122a-m are rebooted using boot images from the SAN 223 and the production applications 213 are executed on the servers 122a-m. Steps 605 and 606 may be performed at the same time.

At step 606, production VMs are booted up in the repurposable recovery environment 120. For example, the servers 122n-z host the VMs in the repurposable recovery environment 120. The production VMs, which are VMs used in the production environment 110, are booted up on one or more of the servers 122n-z. The VMs may be booted up in an order specified in configuration information stored in the SAN 223. Booting up the production VMs also includes running applications 210 on the production VMs in the repurposable recovery environment 120 operating as the recover environment 120a.

At step 607, the recovery environment 120a is validated. For example, the production systems running in the recovery environment 120a generated from the steps 601-606 are tested to ensure they are running properly.

At step 608, after validation at step 607, the users 115 are allowed to access the production systems, including the applications and services 216, in the recovery environment 120a. The users 115 access applications and data to perform their daily tasks as if they were accessing the production environment 110.

After the production environment 110 is recovered, the repurposable recovery environment 120 is reconfigured back to the staging environment 120b. For example, the staging information 331 is used to reconfigure the servers and the network devices back to their previous states. Then, developing and testing can resume in the staging environment 120b. Also, the periodic saving of the production information 230 in the SAN 223 and the storing of any updates to the configuration of the production environment 110 in the SAN 223 resumes while the repurposable recovery environment 120 operates as the staging environment 120b.

One or more of the steps and functions described herein and one or more of the components of the systems described herein may be implemented as computer code stored on a computer readable storage device, such as memory or another type of storage device. The computer code is executed on a computer system, for example, by a processor, application-specific integrated circuit (ASIC), or other type of circuit. The code may exist as software program(s) comprised of program instructions in source code, object code, executable code or other formats.

While the embodiments have been described with reference to examples, those skilled in the art will be able to make various modifications to the described embodiments without departing from the scope of the claimed embodiments.

What is claimed is:

1. A system comprising:
a reconfiguration manager operable to reconfigure a repurposable recovery environment between a recovery environment for a production environment and a second environment different from the recovery environment; and a storage system in the repurposable recovery environment, the storage system periodically saving production information from the production environment while the repurposable recovery environment is operating as the second environment, wherein the production information in the storage system is used to reconfigure the repurposable recovery environment from the second environment to the recovery environment, and the reconfiguration manager
detects a failure of the production environment,
saves, in the storage system, information currently being used by servers in the repurposable recovery environment operating for the second environment,
shuts down the servers, and
reboots the servers using at least one operating system in the storage system, wherein the at least one operating system is different than an operating system used for the second environment, and the rebooted servers are configured to run the at least one operating system used to reboot the servers and execute applications from the production environment.

2. The system of claim 1, wherein the reconfiguration manager reconfigures the repurposable recovery environment from the second environment to the recovery environment through the rebooting of the servers.

3. The system of claim 1, wherein the storage system stores a list of virtual machines used in the production environment and an order for booting up the virtual machines, and
the reconfiguration manager shuts downs virtual machines for the second environment running in the repurposable recovery environment and boots up the production environment virtual machines in the repurposable recovery environment in the order.

4. The system of claim 1, wherein the reconfiguration manager configures network devices in the repurposable recovery environment to have the same settings as network devices in the production environment.

5. The system of claim 1, wherein the reconfiguration manager configures equivalent devices in the repurposable recovery environment to have the same IP addresses of devices in the production environment.

6. The system of claim 5, wherein the devices in the production environment include servers and network devices, and the equivalent devices in the repurposable recovery environment include servers and network devices that are the same model and configuration as the servers and network devices in the production environment.

7. A system comprising:
a reconfiguration manager operable to reconfigure a repurposable recovery environment between a second environment and a recovery environment for a production environment; and
a storage system in the repurposable recovery environment, wherein the storage system periodically stores production information from the production environment, and the storage system stores production software, including at least one operating system and at least one application,
wherein the reconfiguration manager detects a failure of the production environment, and reconfigures the repurposable recovery environment from the second environment to the recovery environment in response to detecting the failure of the production environment, wherein the reconfiguring includes
saving information used in the second environment in the storage system;
shutting down servers in the repurposable recovery environment;
rebooting the servers using the at least one operating system in the storage system, wherein the at least one operating system is different than an operating system used by the servers when operating in the second environment, and at least one of the rebooted servers is configured to run the at least one operating system and execute the at least one application and wherein the at least one application is configured to access the production data in the storage system; and
reconfiguring network devices.

8. The system of claim 7, wherein the second environment is a staging environment, and the information used in the second environment includes information for at least one application being developed or tested in the repurposable recovery environment operating as the staging environment.

9. The system of claim 7, wherein the storage system stores a list of virtual machines used in the production environment and an order for booting up the virtual machines, and
the reconfiguration manager shuts downs virtual machines for the second environment running in the repurposable recovery environment and boots up the production environment virtual machines in the repurposable recovery environment in the order.

10. The system of claim 7, wherein the reconfiguration manager configures the network devices to have the same settings as network devices in the production environment.

11. The system of claim 7, wherein the reconfiguration manager configures equivalent devices in the repurposable recovery environment to have the same IP addresses of devices in the production environment.

12. The system of claim 11, wherein the devices in the production environment include servers and network devices, and the equivalent devices in the repurposable recovery environment include servers and network devices that are the same model and configuration as the servers and network devices in the production environment.

13. A method comprising:
periodically saving production information from a production environment in a storage system in a repurposable recovery environment, wherein the repurposable recovery environment is configurable to operate as a recovery environment for the production environment and is configurable to operate as a second environment different from the recovery environment, and
the periodically saved production information is saved in the storage system when the repurposable recovery environment is operating as the second environment; and
reconfiguring the repurposable recovery environment from the second environment to the recovery environment using the production information in the storage system, wherein the reconfiguring comprises:
shutting down servers in the repurposable recovery environment operating for the second environment; and
rebooting the servers using at least one operating system in the storage system, wherein the at least one operating system is different than an operating system used for the second environment, and the rebooted servers are configured to run the at least one operating system used to reboot the servers and execute applications from the production environment.

14. The method of claim 13, wherein the reconfiguring of the repurposable recovery environment comprises:
shutting down virtual machines running in the second environment;
rebooting production virtual machines using the production information, wherein at least one of the production virtual machines is configured to run an application from the production environment.

15. The method of claim 14, wherein rebooting production virtual machines comprises:
determining a predetermined order to reboot the production virtual machines; and
the rebooting of the production virtual machines is performed in the determined order.

16. The method of claim 13, wherein the reconfiguring of the repurposable recovery environment comprises:
configuring network devices to have same settings as network devices in the production environment.

17. The method of claim 13, comprising:
storing IP addresses used for devices in the production environment; and
the reconfiguring of the repurposable recovery environment comprises configuring equivalent devices in the repurposable recovery environment to have the same IP addresses of the devices in the production environment.

18. A method comprising:
periodically saving production data from a production environment in a storage system in a repurposable recovery environment, wherein the repurposable recovery environment is configurable to operate as a recovery environment for the production environment and is configurable to operate as a second environment different from the recovery environment;
storing production software in the storage system in the repurposable recovery environment, wherein the production software includes the same software used in the production environment and includes at least one operating system and at least one application from the production environment;
storing network configuration information for network devices;
detecting failure of the production environment; and
reconfiguring the repurposable recovery environment from the second environment to the recovery environment in response to detecting the failure of the production environment, wherein the reconfiguring includes
saving information used in the second environment;
shutting down servers in the repurposable recovery environment operating for the second environment;
rebooting the servers using the at least one operating system in the storage system, wherein the at least one operating system is different than an operating system used for the second environment, and at least one of the rebooted servers is configured to run the at least one operating system used to reboot the servers and execute the at least one application and the at least one application is configured to access the production data in the storage system; and
reconfiguring network devices using the stored network configuration.

19. The method of claim 18, wherein the second environment is a staging environment, and the information used in the second environment includes information for at least one application being developed or tested in the repurposable recovery environment operating as the staging environment.

20. The method of claim 18, wherein the reconfiguring of the repurposable recovery environment comprises:
shutting down virtual machines running in the second environment;
rebooting production virtual machines using the production information, wherein at least one of the production virtual machines is configured to run an application from the production environment.

21. The method of claim 20, wherein rebooting production virtual machines comprises:
determining a predetermined order to reboot the production virtual machines; and
the rebooting of the production virtual machines is performed in the determined order.

22. The method of claim 18, wherein reconfiguring network devices comprises:
configuring the network devices to have same settings as network devices in the production environment.

23. The method of claim 18, comprising:
storing IP addresses used for devices in the production environment; and
the reconfiguring of the repurposable recovery environment comprises configuring equivalent devices in the repurposable recovery environment to have the same IP addresses of the devices in the production environment.

24. At least one computer readable medium storing at least one computer program that when executed by a computer performs a method comprising:
periodically saving production information from a production environment in a storage system in a repurposable recovery environment, wherein the repurposable recovery environment is configurable to operate as a recovery environment for the production environment and is configurable to operate as a second environment different from the recovery environment, and
the periodically saved production information is saved when in the storage system when the repurposable recovery environment is operating as the second environment; and
reconfiguring the repurposable recovery environment from the second environment to the recovery environment using the production information in the storage system, wherein the reconfiguring comprises:
shutting down servers in the repurposable recovery environment operating for the second environment; and
rebooting the servers using at least one operating system in the storage system, wherein the at least one operating system is different than an operating system used for the second environment, and the rebooted servers are configured to run the at least one operating system used to reboot the servers and execute applications from the production environment.

25. The at least one computer readable medium of claim 24, wherein reconfiguring of the repurposable recovery environment comprises:
shutting down virtual machines running in the second environment;
determining an order for rebooting production virtual machines in the repurposable recovery environment; and
rebooting the production virtual machines in the order using the production information, wherein at least one of the production virtual machines is configured to run an application from the production environment.

26. The at least one computer readable medium of claim 24, wherein the method comprises:

storing IP addresses used for devices in the production environment; and the reconfiguring of the repurposable recovery environment comprises configuring equivalent devices in the repurposable recovery environment to have the same IP addresses of the devices in the production environment.

* * * * *